UNITED STATES PATENT OFFICE.

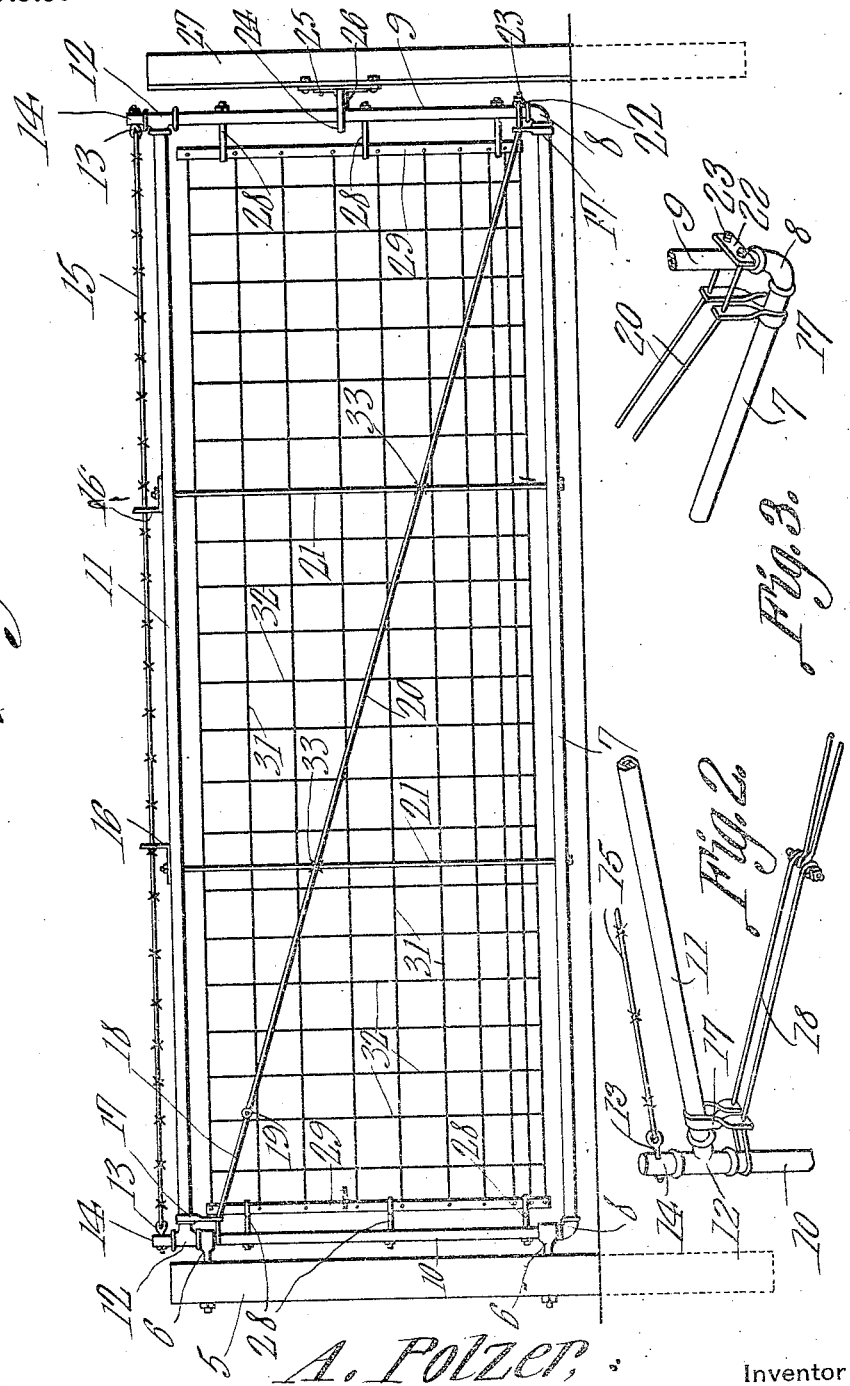

ALOIS POLZER, OF ALBERT, KANSAS.

GATE.

1,024,022.

Specification of Letters Patent.

Patented Apr. 23, 1912.

Application filed September 12, 1911. Serial No. 648,922.

*To all whom it may concern:*

Be it known that I, ALOIS POLZER, a citizen of the United States, residing at Albert, in the county of Barton and State of Kansas, have invented a new and useful Gate, of which the following is a specification.

This invention relates to gate structures, and has for its object to provide novel means for bracing or trussing the gate frame.

This invention is embodied in the novel arrangement and construction of parts as hereinafter described and as pointed out in the appended claims, the invention being illustrated in the accompanying drawings, wherein similar reference characters indicate similar parts, and wherein,—

Figure 1 is an elevation of a gate constructed in accordance with the present invention. Figs. 2, and 3 are perspectives of various fragmental portions of the gate.

Referring specifically to the drawings, the frame of the gate is rectangular in form comprising the uprights 9 and 10 at the ends thereof and the upper and lower horizontal bars 11 and 7. The frame is preferably constructed of piping, the uprights 9 and 10 being connected to the lower bar 7 by means of the elbows 8 and at their upper ends to the bar 11 by T-couplings 12 which are in an upright position and have stubs 14 secured in the upper taps thereof. The stubs 14 are also preferably of piping. Between the bars 7 and 11 are a pair of stay rods 21 which pierce the said bars and have nuts screw-threaded on their outer ends. On the upper bar 11 and below the nuts of the stays 21 are secured the brackets 16 and a strand of barbed wire 15 is stretched between the stubs 14, being supported at intermediate portions by the brackets 16. The strand 15 is secured to the stub 14 by means of the eye-bolts 13 which permit of the same being drawn taut.

To the uprights 9 and 10 at the ends of the frame are secured a series of eye-bolts 28 having the eyes thereof extended inwardly and a vertical bar 29 is passed through each series of said eye-bolts. Each of the said bars 29 has a series of perforations therein to receive the ends of the horizontal strands 31 of the meshing or netting. The vertical strands of the meshing or netting are designated at 32, this meshing or netting being of the ordinary construction, such as used in fencing. Thus by tightening the eye-bolts 28 the meshing may be drawn taut within the gate frame and forms a filler occupying the space within the said frame. By loosening the bolts 28, the meshing in being slackened can be disengaged from the bars 29 and removed for repair or replacement. This permits a filling of any suitable meshing to be secured in the frame to provide a uniformity in the design of the gate and fence structures.

One end of the gate is hinged to the post 5 by means of the brackets 6 mounted on the said post and bearing against the respective elbow 8 and T-coupling 12 of the upright 10, the upright being pivoted in the brackets.

The gate frame is braced or trussed in a novel manner between the upper hinged corner and the lower free corner. The rod 18 and the intermediate portion thereof passed around the upper end of the upright 10 and through the lower ends of an inverted U-shaped stirrup 17 engaged over the adjacent end of the bar 11 and thence passing on each side of the filler, the extremities thereof being engaged to the yoke pin 19. Two rods 20 have their upper extremities secured to the pin 19 on the respective sides of the filler, and extend to the lower free corner of the gate frame, passing through the upper ends of the U-shaped stirrup 17 engaged over the corresponding end of the bar 7 and also pierce a plate 22 arranged on the outer side and at the lower end of the upright 9 and bearing the outer nuts 23 which are screw-threaded on the ends thereof against the plate 22. Thus by tightening the nuts 23, the truss rods 18 and 20 may be drawn taut to support the free end of the gate in position and prevent the same from sagging. The stirrups 17 are bent from strap iron into a substantially U-shape and have the ends thereof bent angularly and apertured for the passage of the said rods. This form of trussing or bracing dispenses with the necessity of drilling holes in the gate frame which would tend to weaken the same and is substantial and durable. At the intersection of the rods 20 and the stays 21, a wire 33 is knotted around the said members, thus connecting the said members together.

The latch mechanism for locking the gate in closed position need not be described in detail, the same being shown as comprising a latch 24 hinged to the post 27 by means of a plate 25, which plate has the lower end thereof bent upward and deflected outward to form a lip 26 for supporting the latch. Any suitable style of latch may be utilized for locking the gate in closed position.

This gate in being adapted to receive the various fillers may therefore be made to conform in design with the structure of the adjoining fence, and in this manner the obstruction presented by the gate structure is fully as efficient as the obstruction presented by the fence itself. The strand of barbed wire arranged above the fence prevents animals from reaching over the gate, from rubbing on the gate, or from endeavoring to jump over the gate, when the gate is used in a pasture or farm inclosure. This gate is therefore simple in its construction, is substantial and durable and is also efficient in its use.

What is claimed as new is:—

1. A gate frame comprising end uprights and an upper and a lower horizontal bar secured to the said uprights, and a trussing between the upper end corner of the gate and the lower free corner constituting a rod passed around the upper end of the upright at the hinged end of the gate, a stirrup on the adjacent end of the upper bar, the said rod piercing the stirrup, a stirrup on the lower bar at the free end of the gate, a plate on the outer side of the upright at the free end of the gate, a pair of rods secured to the ends of the former rod and piercing the latter stirrup and the said plate, and means for drawing said rods taut.

2. In combination, a gate frame comprising end uprights and an upper and a lower horizontal bar secured to the said uprights, a U-shaped stirrup on the upper bar at the hinged end of the gate, a U-shaped stirrup on the lower bar at the free end of the gate, and means piercing the said stirrup and connecting the upper end of the upright at the hinged end of the gate and the lower end of the upright at the free end of the gate, and adapted to be drawn taut to truss the frame.

In testimony that I claim the foregoing as my own, I have hereto affixed my signature in the presence of two witnesses.

ALOIS POLZER.

Witnesses:
 JOHN ANDREE,
 C. F. GARRETT.